(12) United States Patent
Kerschbaum

(10) Patent No.: US 8,548,172 B2
(45) Date of Patent: Oct. 1, 2013

(54) SECURE DISSEMINATION OF EVENTS IN A PUBLISH/SUBSCRIBE NETWORK

(75) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 31 days.

(21) Appl. No.: 13/178,614

(22) Filed: Jul. 8, 2011

(65) Prior Publication Data

US 2013/0013922 A1    Jan. 10, 2013

(51) Int. Cl.
*H04L 9/08* (2006.01)
*H04L 9/32* (2006.01)

(52) U.S. Cl.
USPC ........... 380/281; 380/282; 380/283; 380/284; 713/168; 713/169; 713/170

(58) Field of Classification Search
USPC ................. 380/281, 282, 283, 284; 713/168, 713/169, 170
See application file for complete search history.

(56) References Cited

U.S. PATENT DOCUMENTS

| | | | | |
|---|---|---|---|---|
| 5,841,865 | A * | 11/1998 | Sudia | 380/286 |
| 7,017,188 | B1 | 3/2006 | Schmeidler et al. | |
| 2005/0102244 | A1* | 5/2005 | Dickinson et al. | 705/74 |
| 2006/0136717 | A1* | 6/2006 | Buer et al. | 713/155 |
| 2007/0206786 | A1* | 9/2007 | Chakraborty | 380/30 |
| 2008/0170695 | A1* | 7/2008 | Adler et al. | 380/277 |
| 2008/0290994 | A1* | 11/2008 | Bruns et al. | 340/10.1 |
| 2010/0114964 | A1* | 5/2010 | Kerschbaum et al. | 707/783 |
| 2010/0235627 | A1* | 9/2010 | Kerschbaum et al. | 713/156 |
| 2011/0025458 | A1 | 2/2011 | Rokhsaz et al. | |

FOREIGN PATENT DOCUMENTS

EP    1367470 A2    12/2003

OTHER PUBLICATIONS

J. Bethencourt, A. Sahai, and B. Waters; Ciphertext-Policy Attribute-Based Encryption; Proceedings of IEEE Symposium on Security and Privacy, Oakland, CA, USA, May 20-23, 2007; IEEE Computer Society Washington, DC, USA; 2007. (http://dl.acm.org/citation.cfm?id=1264219).

D. Boneh, and M. Franklin; Identity-Based Encryption from the Weil Pairing; Proceedings of CRYPTO 2001 (International Cryptology Conference, Santa Barbara, California, USA, Aug. 19-23, 2001); International Association for Cryptologic Research (IACR), University of California, Santa Barbara, CA, USA; 2001. (www.iacr.org/archive/crypto2001/21390212.pdf).

(Continued)

*Primary Examiner* — Krisna Lim

(57) ABSTRACT

Various embodiments of systems and methods to securely disseminate events in publish/subscribe network are described herein. One or more subscribers are authorized to receive events from a publisher through an authorize protocol carried out between the publisher, a trusted party and the one or more subscribers. A security token specific to a product associated with an event is provided, by the publisher, to the authorized one or more subscribers. Further, the event is encrypted using a public key of the trusted party, a security key of the publisher and a secret key of the publisher. The encrypted event is disseminated, by the publisher, in a publish/subscribe network. Furthermore, the encrypted event is received by the authorized one or more subscribers. The encrypted event is decrypted using the security token and an authorization key by the authorized one or more subscribers.

22 Claims, 6 Drawing Sheets

(56) References Cited

OTHER PUBLICATIONS

M. Blaze, G. Bleumer, and M. Strauss; Divertible Protocols and Atomic Proxy Cryptography; Proceedings of EUROCRYPT 1998 (International Conference on the Theory and Application of Cryptographic Techniques, Espoo, Finland, May 31-Jun. 4, 1998); International Association for Cryptologic Research (IACR), University of California, Santa Barbara, CA, USA; 1998. (http://citeseer.ist.psu.edu/viewdoc/summary?doi=10.1.1.81.8246).

V. Goyal, O. Pandey, A. Sahai, and B. Waters; Attribute Based Encryption for Fine-Grained Access Control of Encrypted Data; Proceedings of the 13th ACM Conference on Computer and Communications Security (CCS 2006), Alexandria, VA, USA; ACM New York, NY, USA; 2006. (http://dl.acm.org/citation.cfm?id=1180418).

A. Sahai, and B. Waters; Fuzzy Identity Based Encryption; Proceedings of EURO-CRYPT 2005 (International Conference on the Theory and Applications of Cryptographic Techniques) Aarhus, Denmark, May 22-26, 2005; International Association for Cryptologic Research (IACR), University of California, Santa Barbara, CA, USA; 2005. (http://citeseer.ist.psu.edu/viewdoc/summary?doi=10.1.1.9.5991).

European Search Report for EP Application No. 12004933.3-1244, mailed Feb. 1, 2013, 07 pages; EPO, Rijswijk, Netherlands.

* cited by examiner

| STEP | PARTY | INPUT | OUTPUT |
|---|---|---|---|
| SETUP | TRUSTED PARTY | K | PRV, PBK |
| FORWARD | PUBLISHER | $K_P$, $FWD_{PS}$ | $K_S$ |
| ENCRYPT | PUBLISHER | M, PBK, $K_P$, $SK_P$ | C |
| DECRYPT | SUBSCRIBER | C, $K_S$, $AUTH_{PS}$ | M |

FIG. 4A

| PROTOCOL | INPUT | | | OUTPUT | | |
|---|---|---|---|---|---|---|
| | PUBLISHER | SUBCRIBER | TRUSTED PARTY | PUBLISHER | SUBCRIBER | TRUSTED PARTY |
| REGISTER | - | - | - | $SK_P$ | $SK_S$ | $TK_P$, $TK_S$ |
| TRACE | - | NA | $TK_P$, $TK_S$ | $FWD_{PS}$ | NA | - |
| AUTHORIZE | $SK_P$ | - | PRV, $TK_S$ | - | $AUTH_{PS}$ | - |

FIG. 4B

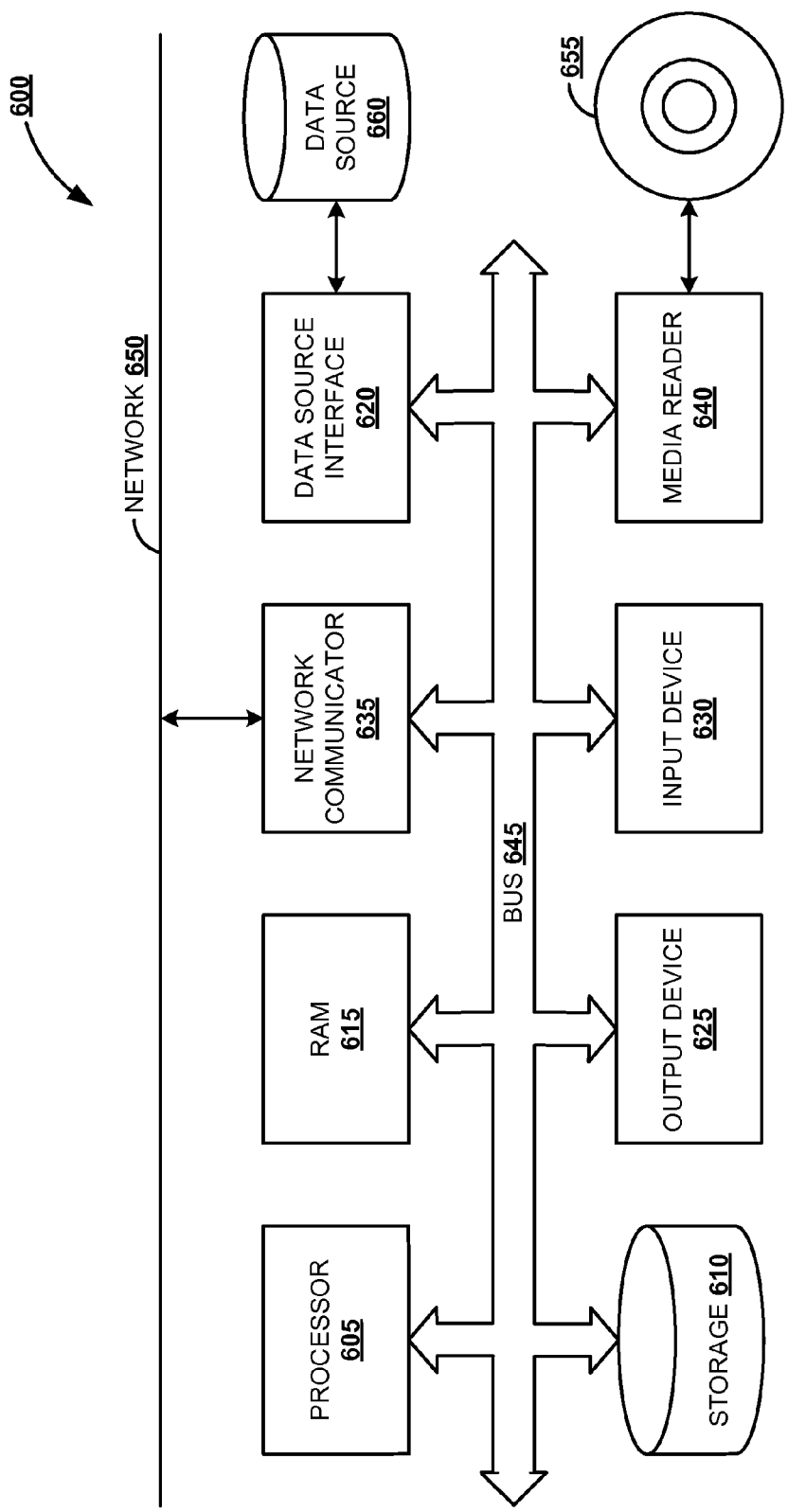

SECURE DISSEMINATION OF EVENTS IN A PUBLISH/SUBSCRIBE NETWORK

FIELD

Embodiments generally relate to computer systems and more particularly to methods and systems to securely disseminate events in a publish/subscribe network.

BACKGROUND

Typically, a publish/subscribe network is widely used by organizations for event based applications such as supply chain management. In supply chain management, organizations track the product using tags such as Radio Frequency Identification (RFID) tags in order to increase visibility across the supply chain and improve its performance using the publish/subscribe network. The events disseminated in the supply chain application using the publish/subscribe network not only reveal the information necessary to enable the supply chain application, but also reveal additional information about the organization's operation. They may, for example, reveal strategic supplier relationships, planned promotions, best practices, and the like.

Therefore, the method of dissemination of events in the publish/subscribe network raises security concerns, since the events of the supply chain operations are considered sensitive by the organizations. Therefore, restrictive access-control policies are necessary as the events are disseminated in publish/subscribe networks where there is no access control policy enforcement point and also the subscribers may be unknown.

In existing methods, a password or symmetric key is stored on each RFID tag in an encryption scheme that enables accessing events for the particular product. Every party that receives the RFID tag can store the password and can then access events. However, the password needs to be safeguarded. Therefore, the password needs to be encrypted on the RFID tag and stored securely in order to prevent theft. Moreover, the password is not traceable, i.e. if it is leaked, it cannot be determined which party has leaked the password. As a consequence, most publishers may not be inclined to safeguard the password or may even deliberately reveal it to outsiders. Therefore, it is desirable to provide a method which enables secure dissemination of events in the publish/subscribe network.

SUMMARY

Various embodiments of systems and methods to securely disseminate events in a publish/subscribe network are described herein. In one aspect, one or more subscribers are authorized to receive events from a publisher through an authorize protocol carried out between the publisher, a trusted party and the one or more subscribers. A security token specific to a product associated with an event is provided, by the publishers, to the authorized one or more subscribers. Further, the event is encrypted using a public key of the trusted party, a security key of the publisher and a secret key of the publisher. The encrypted event is disseminated, by the publisher, in a publish/subscribe network. In another aspect, the encrypted event is received by the authorized one or more subscribers. Further, the encrypted event is decrypted using the security token and an authorization key by the authorized one or more subscribers.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 4A and FIG. 4B are tables illustrating steps and protocols used in disseminating events, according to an embodiment.

FIG. 6 is a block diagram illustrating a computing environment in which the techniques described to disseminate events in a publish/subscribe network, according to an embodiment.

DETAILED DESCRIPTION

Figure 1:
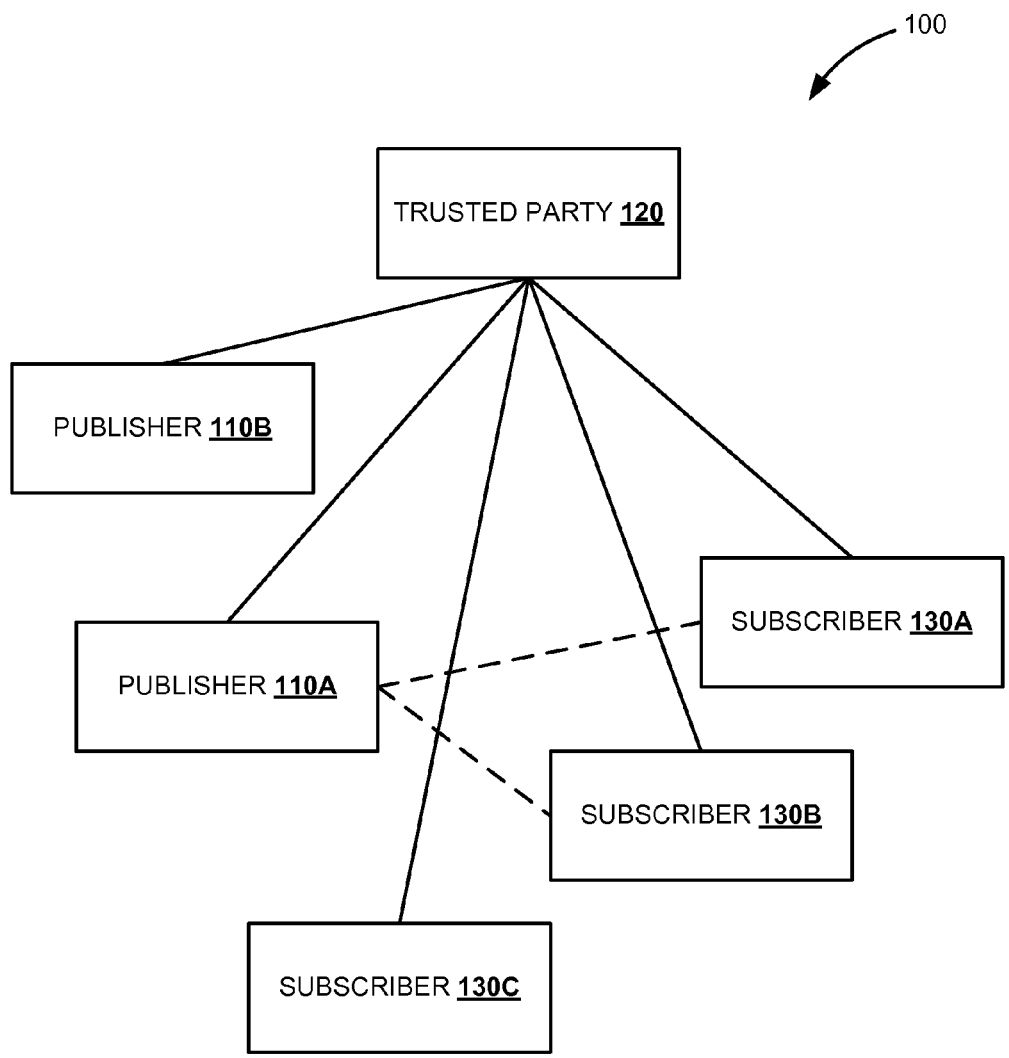
FIG. 1 is a block diagram illustrating a publish/subscribe network, according to an embodiment.

Embodiments of techniques for disseminating events in a publish/subscribe network are described herein. The publish/subscribe network uses asynchronous communication paradigm where senders, known as publishers, and receivers or recipients, known as subscribers, are communicatively coupled. The messages that publishers generate to publish are called events. The publisher and the subscriber can represent an organization or an enterprise. Also, the publisher and the subscriber can be processing objects within the organization. The processing objects can be desktop computers, work stations, laptop computers, hand held computers, smart phone, console devices or similar portable computing systems. The publisher, the subscriber and the trusted party are considered as parties of the publish/subscribe network.

According to one embodiment, subscribers in the publish/subscribe network are authorized to receive events from a publisher through an authorize protocol carried out between the publisher, a trusted party and the subscribers. Further, a security token specific to a product associated with an event is provided, by the publisher, to the authorized subscribers. Furthermore, the event is encrypted using a public key of the trusted party, a security key of the publisher and a secret key of the publisher and the encrypted event is disseminated, by the publisher, in the publish/subscribe network.

In an embodiment, the encrypted event is decrypted by the authorized subscribers using the security token and an authorization key. Thereby, the events are securely disseminated in the publish/subscribe network by the publisher ensuring authorized subscribers having the security token can decrypt the disseminated events. Further, the trusted party keeps track of the reception of the disseminated events ensuring traceability of products associated with the event in the publish/subscribe network. Therefore, secure dissemination of events that can only be decrypted by a selected set of authorized subscribers that have been in possession of the product is achieved.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

FIG. 1 is a block diagram 100 illustrating a publish/subscribe network, according to an embodiment. The publish/subscribe network includes a plurality of publishers (e.g., publisher 110A and publisher 110B) and a plurality of subscribers (e.g., subscriber 130A, subscriber 130B and subscriber 130C). In one embodiment, a trusted party 120 is communicatively coupled to the publishers (e.g., publisher 110A and publisher 110B) and the subscribers (e.g., subscriber 130A, subscriber 130B and subscriber 130C) through register protocol. In other words, the publishers and subscribers are registered with the trusted party 120. The lines between the trusted party 120 and the publishers; and between the trusted party 120 and the subscribers indicate direct communication. The dotted lines between the publishers and the subscribers indicate that there may be a plurality of other parties in between the communication.

In one embodiment, the subscribers desired by the publisher are authorized by the publisher through the trusted party using 'authorize' protocol. For example, if the publisher 110A desires to send events only to the subscriber 130A and 130B, then the publisher 110A authorizes subscriber 130A and subscriber 130B using the trusted party 120. In operation, when the publisher 110A disseminates events, then the subscriber 130A and the subscriber 130B can decrypt the event. However, even though subscriber 130C receives the event (as the subscriber 130C is also present in the publish/subscribe network), the subscriber 130C may not be able to decrypt the event. In one embodiment, the events are encrypted using subject attributes and object attributes based encryption before disseminating the event in the publish/subscribe network (as described in greater detail in FIG. 2 and FIG. 3).

Further, a secret token is generated by the publisher specific to a product associated with the event and is provided to the authorized subscribers. In one exemplary embodiment, the product is an item circulated between the parties of the publish/subscribe network in a supply chain. In one exemplary embodiment, the secret token can be included in a tag (e.g., RFID (Radio Frequency Identification) tag) on the product of the supply chain management. In another exemplary embodiment, the secret token can be provided as an accompanying electronic message to the authorized subscribers. In yet another exemplary embodiment, the secret token can be stored in a secure place where only authorized subscribers can access.

In one embodiment, at the authorized subscriber, both the authorization key as well as the secret token is needed to decrypt the event disseminated by the publisher. If either of the keys is missing, then the subscriber may not be able to decrypt the event. In other words, it can be ensured that the authorized subscribers that are in possession of the product can decrypt the disseminated event. Also, the trusted party keeps the track of the event dissemination. This implements a strong form of traceability of items in the publish/subscribe network.

Figure 2:
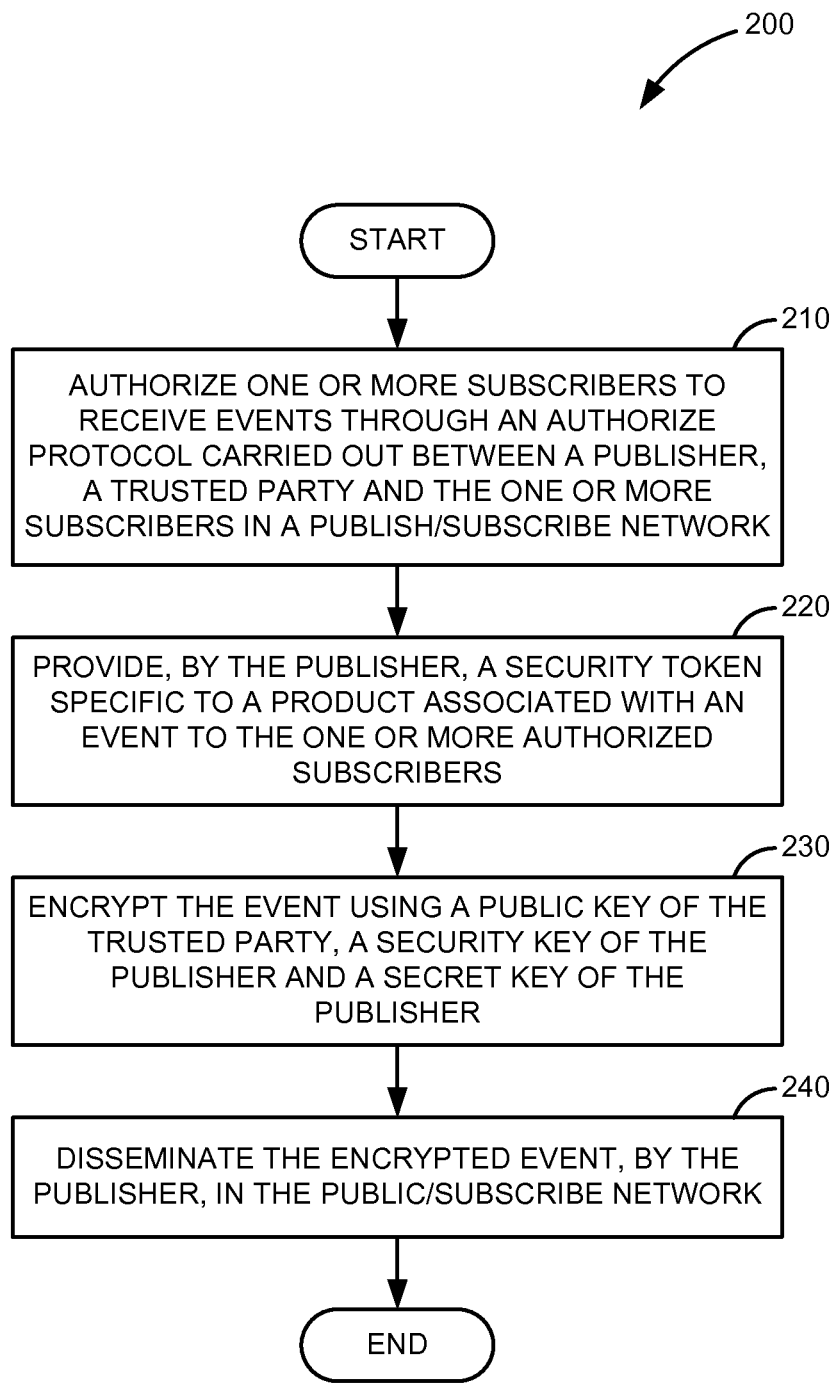
FIG. 2 is a flow diagram illustrating a method to securely disseminate events in a publish/subscribe network, according to an embodiment.

FIG. 2 is a flow diagram 200 illustrating a method to securely disseminate events in a publish/subscribe network, according to an embodiment. In one exemplary embodiment, a publisher and one or more subscribers in the publish/subscribe network are registered with a trusted party through a 'register' protocol using a public key of the trusted party. In one embodiment, the public key is published by the trusted party specific to publish/subscribe network while executing 'setup' (described in greater detail in FIG. 4A).

At step 210, the one or more subscribers are authorized to receive events from the publisher through an 'authorize' protocol carried out between the publisher, the trusted party and the one or more subscribers. For example, considering the publisher's desire to send the events only to two subscribers in the publish/subscribe network, the two subscribers are authorized by the publisher through the 'authorize' protocol. In one embodiment, an authorization key is generated at the authorized subscribers when the 'authorize' protocol is executed. It is to be noted that the 'authorize' protocol is executed once during the initial set up of the communication. It is not necessary to execute the 'authorize' protocol for every event being disseminated.

At step 220, a security token specific to a product associated with an event is provided, by the publisher, to the authorized one or more subscribers. In one embodiment, the security token specific to the event is generated at the publisher using a security key and a forwarding key of the publisher. The forwarding key is generated by the publisher through a 'trace' protocol carried out between the publisher and the trusted party depending on the authorized one or more subscribers. There are different ways to provide the security token to the authorized one or more subscribers such as providing through a product associated with the event using RFID tag, storing in a secure place which can be accessed by the authorized subscribers, providing through an accompanying electronic message and the like. It is to be noted that the security token is generated for every product associated with the event being disseminated by the publisher.

At step 230, the event is encrypted using a public key of the trusted party, a security key of the publisher and a secret key of the publisher. In one embodiment, the public key is published by the trusted party specific to publish/subscribe network while executing setup. The security key is specific to the product associated with the event as assigned by the publisher. The secret key is generated by the publisher through a 'register' protocol carried out between the publisher and the trusted party. Therefore, this type of attribute based encryption includes both subject attributes i.e., attributes of the subscriber accessing the event (e.g., authorization key), as well as object attributes i.e., attributes of the product such as a product identifier (e.g., security token).

At step 240, the encrypted event is disseminated by the publisher in the publish/subscribe network. The one or more subscribers in the publish/subscribe network registered with the trusted party receive the disseminated event. In one embodiment, the authorized subscribers having the security token can decrypt the event. In general, the private key held by the trusted party, the secret keys held by the publishers and subscribers, the secret token is provided to the authorized subscriber are entangled to encrypt and decrypt the event. The combination of subject attributes and object attributes enables enforcing visibility policies in the publish/subscribe network and also, the events are securely disseminated. The method disclosed in FIG. 2 is described in detail with an example in FIG. 3.

Figure 3:
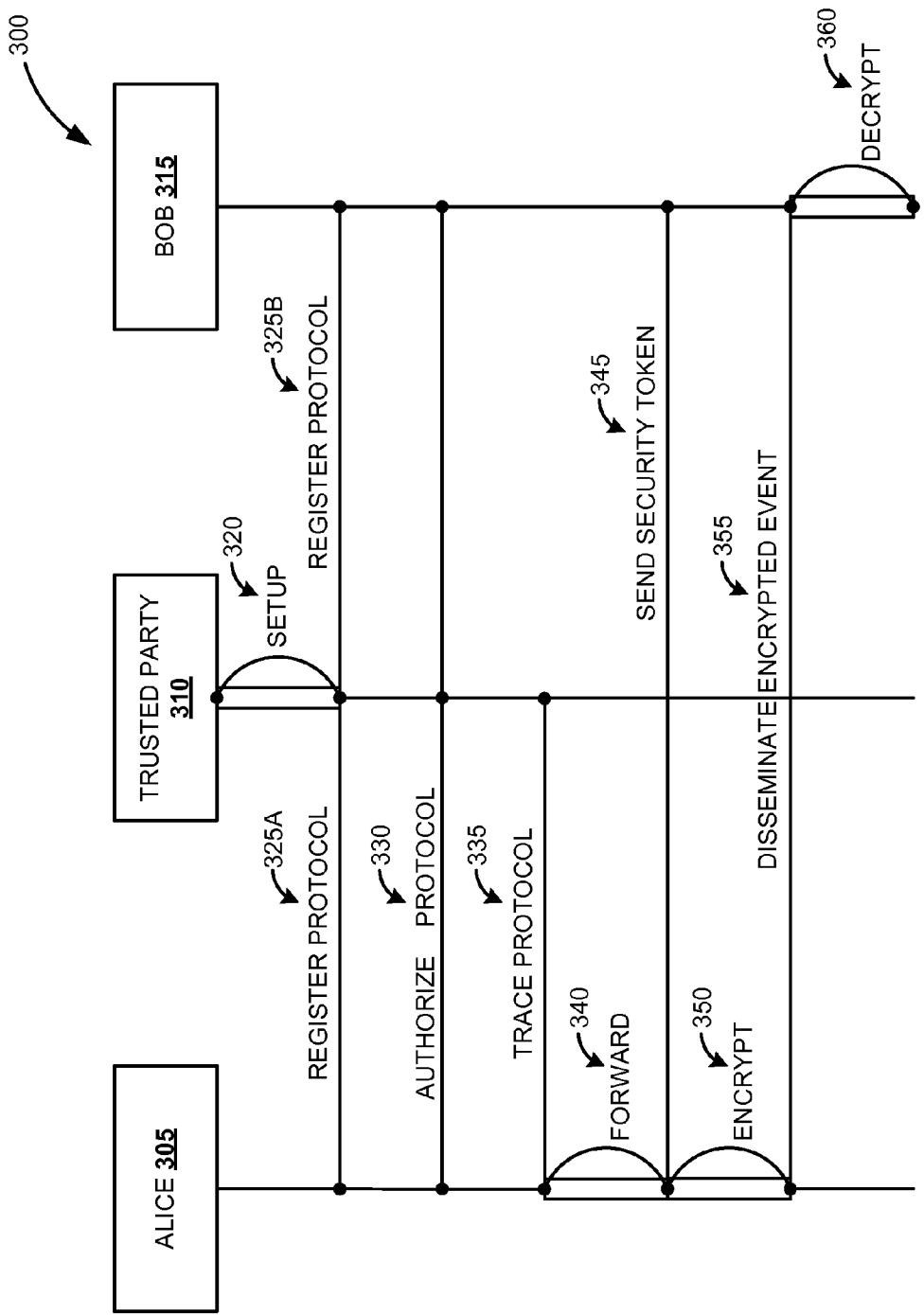
FIG. 3 is a sequence diagram illustrating an exemplary data flow for disseminating events in a publish/subscribe network, according to an embodiment.

FIG. 3 is a sequence diagram 300 illustrating an exemplary data flow for securely disseminating events in a publish/subscribe network, according to an embodiment. The sequence diagram 300 represents the interactions and the operations involved in the method to securely disseminate events in the publish/subscribe network. FIG. 3 illustrates process objects including the publisher (e.g., Alice 305), a trusted party 310 and a subscriber (e.g., Bob 315) along with their respective vertical lines originating from them. The vertical lines of Alice 305, the trusted party 310 and Bob 315 represent the processes that may exist simultaneously. The horizontal lines (e.g., 325A, 325B, 330, 335, 345 and 355) represent execution of protocols between the vertical lines originating from their respective process objects (e.g., Alice 305, the trusted party 310 and Bob 315). Activation boxes (e.g., 320, 340, 350 and 360) represent the steps that are being performed in the respective process object (e.g., Alice 305, the trusted party 310 and Bob 315).

In one embodiment, at activation box 320, the trusted party 310 executes 'setup' step. With the execution of 'setup' step, a private key and a public key are generated with the input of a security parameter at the trusted party. The security parameter is specific to the trusted party. Further, the public key is published by the trusted party in the publish/subscribe network.

At step 325A, Alice 305 executes a 'register' protocol carried out between Alice 305 and the trusted party 310, to get registered with the trusted party 310. With the execution of the 'register' protocol, a secret key specific to Alice 305 is generated at Alice 305 and corresponding trusted key is generated at the trusted party 310. Similarly at step 325B, Bob 315 executes the 'register' protocol to get registered with the trusted party 310.

At step 330, Alice 305 authorizes Bob 315 to receive events from Alice 305 through an 'authorize' protocol. The 'authorize' protocol is carried out between Alice 305, the trusted party 310 and Bob 315. With the execution of the 'authorize' protocol, an authorization key is generated at Bob 315, which is used for decrypting the received events from Alice 305 at later stage. This step of authorization is performed once and it is not necessary to execute 'authorize' protocol before disseminating every event. Therefore, no additional overhead is created besides adding a one-time authorization process.

At step 335, Alice 305 executes a 'trace' protocol with the trusted party 310 outputting a forwarding key. Further at activation box 340, Alice 305 executes a 'forward' step generating a security token when preparing for a shipment of products to Bob 315. Alice 305 provides the security token to Bob 315. For every product, the 'trace' protocol and the 'forward' step are executed.

At activation box 350, Alice 305 encrypts the event using the public key of the trusted party 310, a security key of Alice 305 and the secret key of Alice 305. At step 355, Alice 305 disseminates the event in the publish/subscribe network. Encrypting the event at Alice 305 and disseminating the event by the publisher may be performed once for every event.

At activation box 360, Bob 315, the authorized subscriber, decrypts the encrypted event and obtains the event message using the authorization key and the security token. In one exemplary embodiment, parties in the publish/subscribe network can store the received event and can access the security token whenever they receive the product at later stage. It is appreciated that the example described in FIG. 3 can be easily extended to more than two parties of publishers for forwarding and event publishing. Also, the communication between Alice 305, the trusted party 310 and Bob 315 are carried out over secure and authenticated communication channels. The steps and protocols mentioned in FIGS. 1, 2 and 3 are described in greater detail in FIGS. 4A and 4B.

FIG. 4A and FIG. 4B are tables illustrating 'steps' and 'protocols' used in disseminating events, according to an embodiment. FIG. 4A is a table 400A illustrating 'steps' used in securely disseminating events in a publish/subscribe network. In one embodiment, 'setup' step is executed at a trusted party. The 'setup' is the step, where upon input of the security parameter (K), a private key (PRV) and a corresponding public key (PBK) are generated. The security parameter (K) is possessed by the trusted party. The private key (PRV) is stored at the trusted party and used in generating a secure key in further process (e.g., during authorization). The public key (PBK) is published by the third party in the publish/subscribe network. The interested parties in the publish/subscribe network can register to the trusted party using the public key (PBK).

In one embodiment, a 'forward' step is executed at a publisher. The 'forward' is the step, where upon input of a security key ($K_P$) and a forwarding key ($FWD_{PS}$), a security token ($K_S$) is generated at the publisher. The input security key ($K_P$) may either be received by the publisher with the products or randomly generated if the publishers are manufacturing the products. The forwarding key ($FWD_{PS}$) is obtained by a 'trace' protocol (described in FIG. 4B). In one embodiment, the security token ($K_S$) is provided to the subscriber.

In one embodiment, an 'encrypt' step is executed at the publisher. The 'encrypt' is the step, where upon input of an event (E), the public key (PBK), the security key ($K_P$) and a secret key ($SK_P$), a ciphertext (C) of the event (E) is generated. The ciphertext (C) is the result of encryption performed on plaintext of the event (E). The secret key ($SK_P$) is generated at the publisher through a 'register' protocol (described in FIG. 4B). In one embodiment, 'decrypt' step is executed at a subscriber. The 'decrypt' is the step, where upon input of the ciphertext (C), the security token ($K_S$) and an authorization key ($AUTH_{PS}$), the event plaintext (E) is obtained.

FIG. 4B is a table 400B illustrating 'protocols' used in disseminating events, according to an embodiment. In one embodiment, 'register' protocol is carried out between the publisher and the trusted party, and between the subscriber and the trusted party. The 'register' is the protocol that generates a secret key ($SK_P$) at the publisher and corresponding trusted key ($TK_P$) at the trusted party when a request is made by the publisher to register with the trusted party. Similarly, a secret key ($SK_S$) is generated at the subscriber and corresponding trusted key ($TK_S$) is generated at the trusted party when a request is made by the subscriber to register with the trusted party.

In one embodiment, a 'trace' protocol is carried out between the publisher and the trusted party. Upon receiving a request for tracing the desired subscriber by the publisher, the 'trace' protocol is executed. The 'trace' protocol generates the forwarding key ($FWD_{PS}$) at the publisher based on the input of the trusted key ($TK_P$) of the publisher and the trusted key ($TK_S$) by the trusted party. With the execution of the 'trace' protocol, the trusted party is aware that the publisher forwards the security token to the subscriber.

In one embodiment, an 'authorize' protocol is carried out between the publisher, the trusted party and the subscriber. The 'authorize' protocol generates the authorization key (AU- $TH_{PS}$) at the subscriber based on the input of the secret key ($SK_P$), the private key (PRV) and the trusted key ($TK_S$). The trusted key ($TK_S$) corresponding to the subscriber is generated by the trusted party through the 'register' protocol (described in FIG. 4A).

Figure 5:
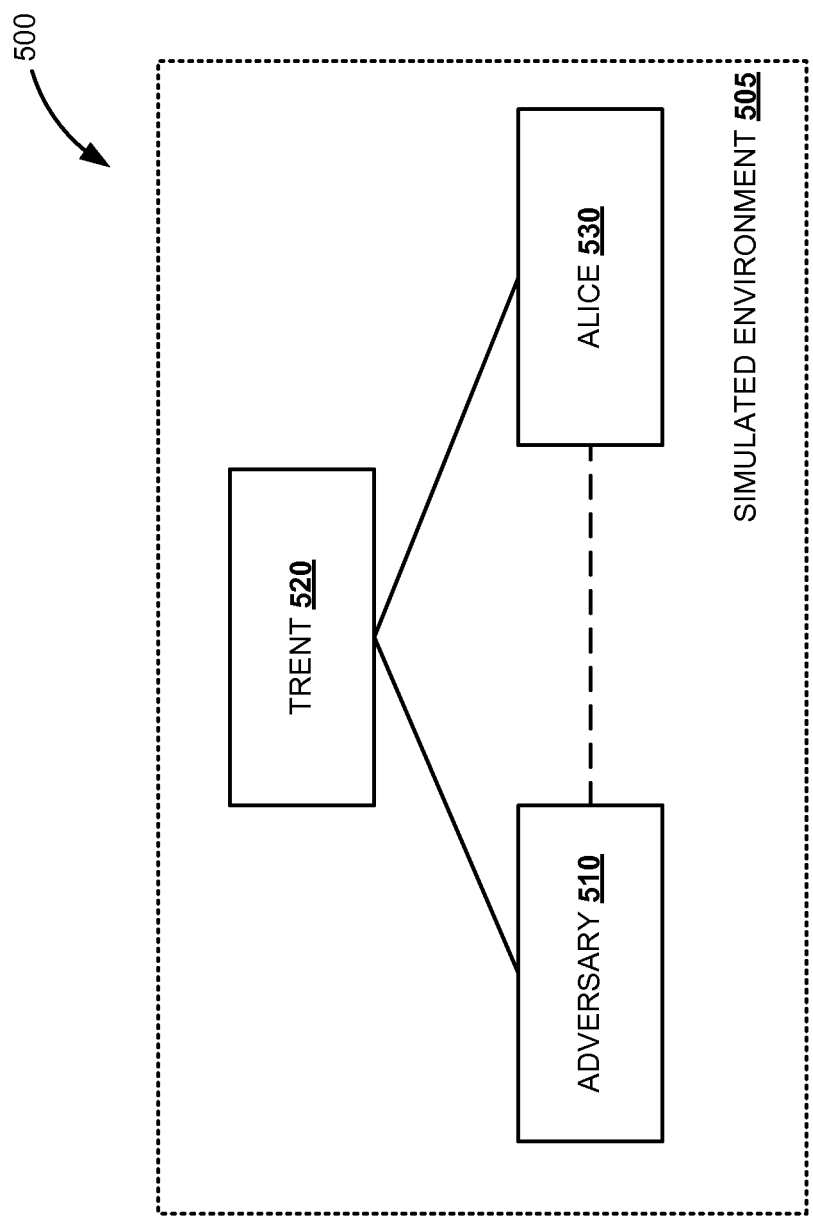
FIG. 5 is a block diagram illustrating disseminating events in a simulation environment, according to an embodiment.

FIG. 5 is a block diagram 500 illustrating disseminating events in a simulation environment 505 of a publish/subscribe network, according to an embodiment. Disseminating the events by encrypting the events as described in FIG. 2 ensures a publisher that a subscriber can decrypt the encrypted events only if the subscriber has a security token and an authorization key. In one exemplary embodiment, this condition can be analyzed considering the below described two exemplary cases using mathematical assumptions such as (Modified) Decisional Diffie-Hellman Assumption.

For example, an adversary 510 operates as a party or a processing object of the supply chain in the simulated environment 505 of the publish/subscribe network. Further, the simulated environment 505 consists of a trusted party, Trent 520 and another party, Alice 530 in the supply chain. Consider Case A where an adversary 510 is excluded from executing the necessary 'authorize' protocol and in Case B where the adversary 510 is excluded from obtaining the necessary forwarded security token.

Case A: A simulator hands a public key to the adversary 510. In one exemplary embodiment, the simulator can be a module used to analyze behavior of the method described in FIG. 2. The adversary 510 may register with Trent 520 via 'register' protocol. The adversary 510 may request a forwarding key to Alice 530 via 'trace' protocol. In one phase, the adversary 510 may request Alice 530 to generate (and provide) security token $K_B$. The adversary 510 may request Alice 530 to encrypt (and publish) event plaintext 'm', even corresponding to a security token $K_A$ or $K_B$ of adversary's 510 choice. This phase ends at the discretion of the adversary 510. Now, the simulator chooses a security token $K^*_A$ and gives the security token 'Forward($K^*_A$, $FWD_{AB}$)' to the adversary 510. The adversary 510 chooses two plaintexts of the event as $m^*_0$ and $m^*_1$ and gives them to the simulator. The simulator flips a random coin $f \in \{0, 1\}$, encrypts $m^*_f$ under $K^*_A$ and gives the ciphertext c* to the adversary 510. In another phase, the adversary 510 may request the same operations from Alice 530 as in the first phase. This phase also ends at the discretion of the adversary 510. As the result, the adversary 510 outputs a guess f* of f. It is true if adversary 510 correctly guesses f*=f. The advantage of the adversary in decrypting the event is $Adv^{WOAUTH}(1^k)=|Pr[f^*=f]-1/2|$.

Case B: The simulator hands a public key to the adversary 510. The adversary 510 may register with Trent 520 via 'register' protocol. The adversary 510 may request a forwarding key to Alice 530 via 'trace' protocol. Unlike Case A, the adversary 510 may request to be authorized by Alice 530 via 'authorize' protocol. In one phase, the adversary 510 may request Alice 530 to generate (and provide) security tokens $K_B$. The adversary 510 may request Alice 530 to encrypt (and publish) the event with plaintext m, even corresponding to a security token (item) $K_A$ or $K_B$ of adversary's 510 choice. This phase ends at the discretion of the adversary 510. The simulator chooses a security token $K^*_A$. Unlike Case A, the security token is not given to the adversary 510. The adversary 510 chooses two plaintexts $m^*_0$ and $m^*_1$ and gives them to the simulator. The simulator flips a random coin $f \in \{0, 1\}$, encrypts $m^*_f$ under $K^*_A$ and gives the ciphertext c* to the adversary 510. In the second phase, the adversary 510 may request the same operations from Alice 530 as in first phase except requests for the security token $K^*_A$. This phase also ends at the discretion of the adversary 510. Now, the adversary 510 outputs a guess f* of f. Again, the adversary 510 may decrypt the event, if the adversary 510 guesses correctly and adversary's 510 advantage is defined accordingly.

In one exemplary embodiment, the subject and object attribute based encryption scheme operates on elliptic curves and uses bilinear maps. Let G and $G_T$ be groups of order p for some large prime 'p' where the bit-size of 'p' is determined by the security parameter k. A bilinear map is a function ê: $G \times G \to G_T$ with the following properties:

Bilinear: for $g \in G$ and a, $b \in Z^*_p$ $$\hat{e}(g^a, g^b) = \hat{e}(g, g)^{ab}$$

Non-degenerate: $\hat{e}(g, g) \neq 1$ is a generator of $G_T$

Computable: there exists an efficient algorithm to compute $\hat{e}(g, g)$ for all $g \in G$ Modified Weil or Tate pairings on super singular elliptic curves are examples of such bilinear maps. With this, the security of the encryption method can be analyzed. If the Bilinear Decisional Diffie Hellman (BDDH) assumption holds, if given values g, $g^a$, $g^b$, $g^c \in G$ and $\hat{e}(g, g)^d \in G_T$ it is not computationally feasible to decide if d=abc. Furthermore, the Modified Bilinear Decisional Diffie Hellman (MBDDH) assumption can be used which includes the additional element $g^{c^{-1}}$. The MBDDH assumption holds, if given values g, $g^a$, $g^b$, $g^c$, $g^{c^{-1}} \in G$ and $\hat{e}(g, g)^d \in G_T$ it is not computationally feasible to decide if d=abc.

In one embodiment, if the BDDH assumption holds, the adversary's advantage $Adv^{WOAUTH}(1^k) < 1/poly(k)$ (Case A) is a negligible function of the security) parameter k. Further, if the MBDDH assumption holds, the adversary's advantage $Adv^{WOFWD}(1^k) < 1/poly(k)$ (Case B) is a negligible function of the security parameter k. Therefore, for the subscriber to decrypt the received event has to be having the authorization key as well as the security token.

In general, nevertheless, event is disseminated in publish/subscribe networks where there is no access control policy enforcement point and recipients may not be known, the subject and object attributes based encryption method enables the publisher to selectively encrypt its events, such that only authorized subscribers that have had possession of the product associated with the event can be able to decrypt. Also, the trusted party is enabled to trace the disseminated event and the product in the supply chain to keep security-relevant information secret. Also, even though securely disseminating the events in the publish/subscribe network is described with an example of supply chains, the method can be extended to other applications such as a cloud based setting with a central and an encrypted database.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to physically store instructions, which when executed by a computer, cause the computer to:

authorize one or more subscribers through a trusted party to receive events corresponding to a product from a publisher;

provide a security token specific to an event to the authorized one or more subscribers, wherein the security token is generated using a security key specific to the product and a forwarding key specific to the authorized one or more subscribers;

encrypt the event using a public key associated with a publish/subscribe network, the security key and a secret key of the publisher corresponding to the trusted party; and disseminate the encrypted event in the publish/subscribe network.

2. The article of manufacture of claim 1, wherein the publisher and the one or more subscribers are registered with the trusted party using the public key of the trusted party.

3. The article of manufacture of claim 1, wherein the security token is generated at the publisher.

4. The article of manufacture of claim 1, wherein the forwarding key is generated by the publisher through the trusted party depending on the authorized one or more subscribers.

5. The article of manufacture of claim 1, wherein the security token is provided to the authorized subscribers by at least one of including a RFID (Radio Frequency Identification) tag on the product, accompanying with an electronic message and storing in a secure place where only authorized subscribers can access.

6. The article of manufacture of claim 1, wherein the public key is published by the trusted party specific to publish/subscribe network.

7. The article of manufacture of claim 1, wherein the security key is assigned by the publisher.

8. The article of manufacture of claim 1, wherein the secret key is generated by the publisher when the publisher registers with the trusted party.

9. The article of manufacture of claim 1, further comprising instructions, which when executed by a computer, cause the computer to:

receive the encrypted event by the authorized one or more subscribers; and decrypt the encrypted event using the security token and an authorization key by the authorized one or more subscribers.

10. The article of manufacture of claim 9, wherein the authorization key is generated at the authorized one or more subscribers when the one or more subscribers are authorized through the trusted party.

11. A computer implemented method to securely disseminate events in a publish/subscribe network, the method comprising:

authorizing one or more subscribers through a trusted party to receive events corresponding to a product from a publisher;

the computer, providing a security token specific to an event to the authorized one or more subscribers, wherein the security token is generated using a security key specific to the product and a forwarding key specific to the authorized one or more subscribers;

the computer, encrypting the event using a public key associated with the publish/subscribe network, the security key and a secret key of the publisher corresponding to the trusted party; and disseminating the encrypted event in the publish/subscribe network.

12. The computer implemented method of claim 11, wherein the publisher and the one or more subscribers are registered with the trusted party using the public key of the trusted party.

13. The computer implemented method of claim 11, wherein the security token is generated at the publisher.

14. The computer implemented method of claim 11, wherein the forwarding key is generated by the publisher through the trusted party depending on the authorized one or more subscribers.

15. The computer implemented method of claim 11, wherein the security token is provided to the authorized subscribers by at least one of including a RFID (Radio Frequency Identification) tag on the product, accompanying with an electronic message and storing in a secure place where only authorized subscribers can access.

16. The computer implemented method of claim 11, wherein the public key is published by the trusted party specific to publish/subscribe network.

17. The computer implemented method of claim 11, wherein the security key is assigned by the publisher.

18. The computer implemented method of claim 11, wherein the secret key is generated by the publisher when the publisher registers with the trusted party.

19. The computer implemented method of claim 11, further comprising:

receiving the encrypted event by the authorized one or more subscribers; and decrypting the encrypted event using the security token and an authorization key by the authorized one or more subscribers.

20. The computer implemented method of claim 19, wherein the authorization key is generated at the authorized one or more subscribers when the one or more subscribers are authorized through the trusted party.

21. A subject and object attribute based encryption and decryption system to securely disseminate events in a publish/subscribe network, the subject and object attribute based encryption and decryption system comprising:

a publishing system including a processor, the processor communicating with one or more memory devices storing instructions to:

authorize one or more subscriber systems through a trusted party to receive events corresponding to a product;

provide a security token specific to an event to the authorized one or more subscriber systems, wherein the security token is generated using a security key specific to the product and a forwarding key specific to the authorized one or more subscriber systems;

encrypt the event using a public key associated with the publish/subscribe network, the security key and a secret key of the publisher corresponding to the trusted party; and disseminate the encrypted event in the publish/subscribe network; and the one or more subscriber systems communicatively coupled to the publishing system, the one or more subscriber systems including instructions to:

receive the encrypted event; and decrypt the encrypted event using the security token and an authorization key.

22. The subject and object attribute based encryption and decryption system of claim 21, further comprising the trusted party system, wherein the publisher system and the one or more subscriber systems are registered with the trusted party system using the public key of the trusted party.

* * * * *